Jan. 14, 1936.  E. H. HINCHLIFFE  2,027,729
METHOD AND APPARATUS FOR REMOVING FEATHERS FROM FOWL
Filed Jan. 17, 1933  3 Sheets-Sheet 3
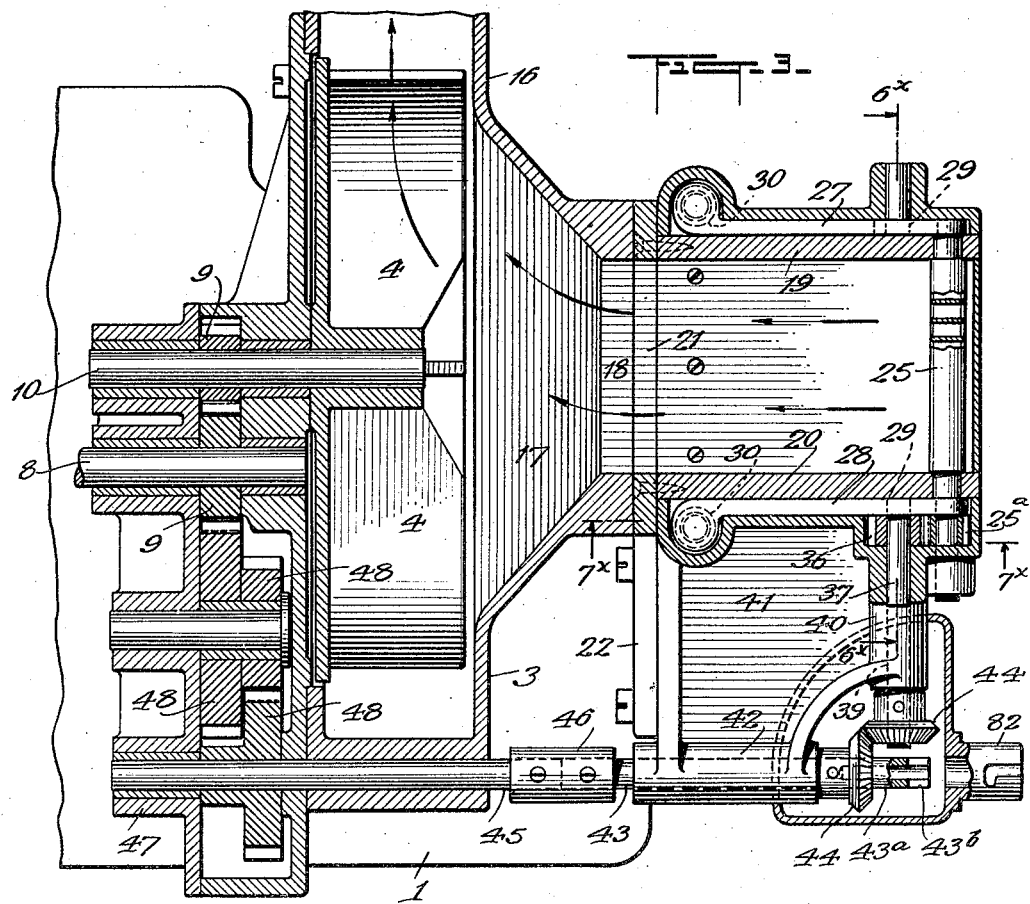
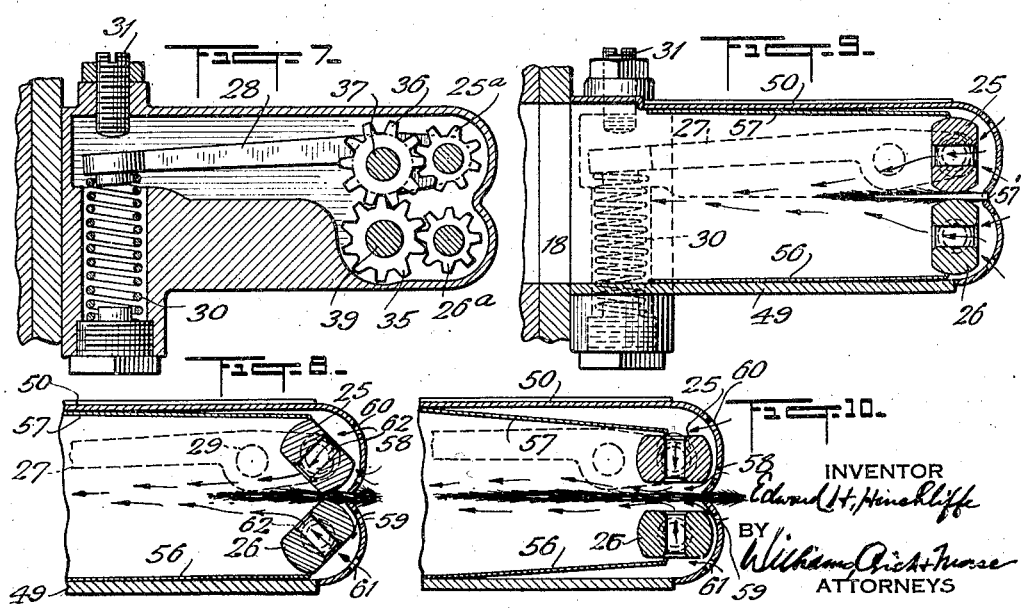
INVENTOR
Edward H. Hinchliffe
BY
William Rich + Morse
ATTORNEYS Patented Jan. 14, 1936

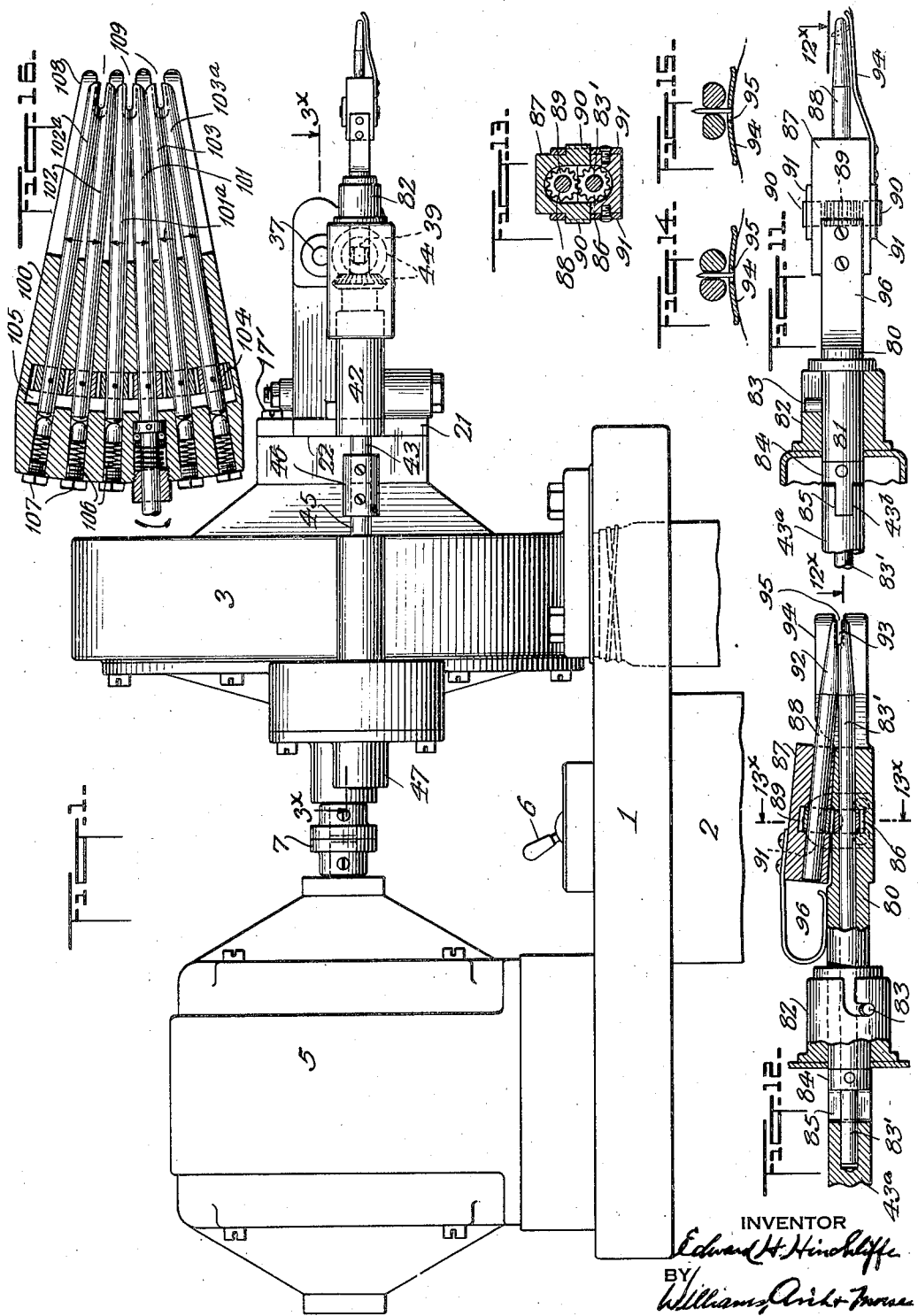

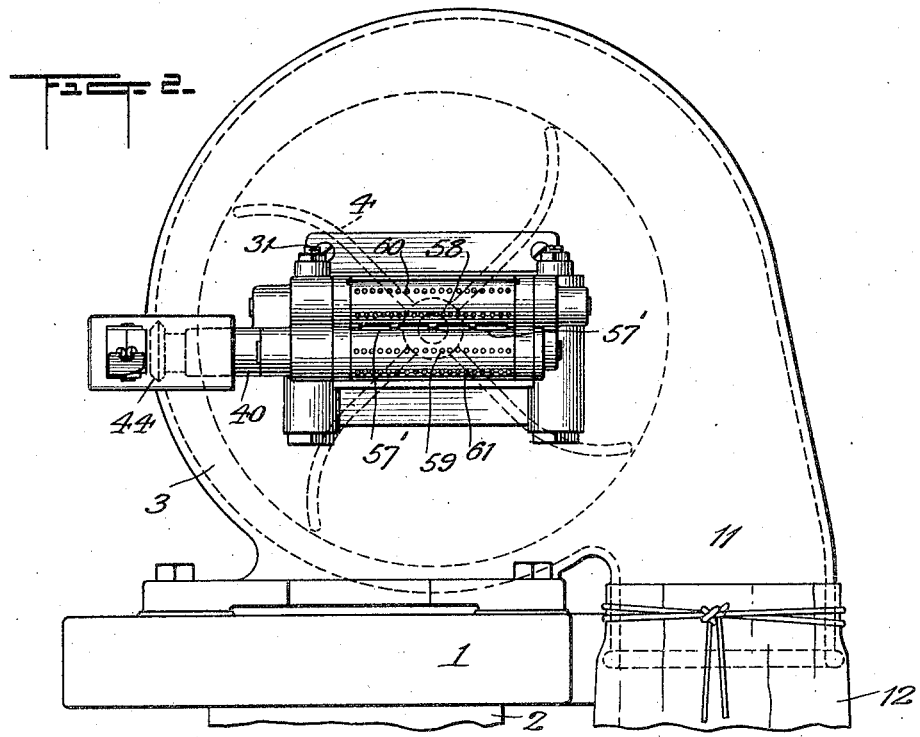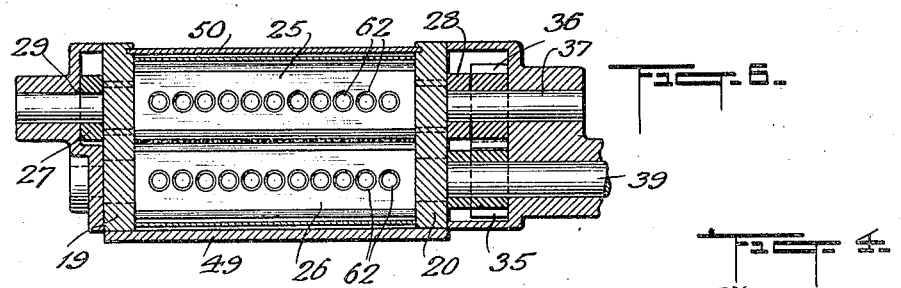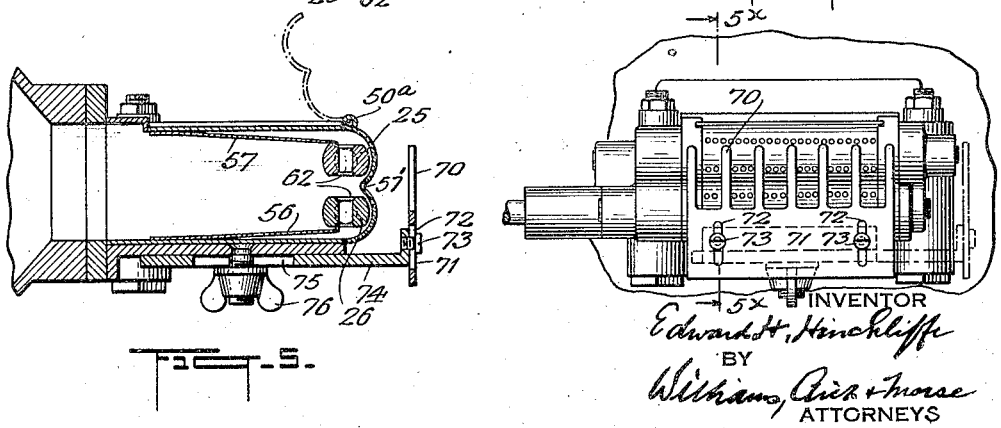

2,027,729

UNITED STATES PATENT OFFICE 2,027,729

METHOD AND APPARATUS FOR REMOVING FEATHERS FROM FOWL

Edward H. Hinchliffe, Lynbrook, N. Y., assignor of one-half to Albert R. Hurd, Malverne, Long Island, N. Y.

Application January 17, 1933, Serial No. 652,107

21 Claims. (Cl. 17—11)

My present invention has for its object to provide a commercially practicable machine for plucking fowl rapidly and economically and without injury to the skin of the bird irrespective of the size or character of the feathers.

A further object of the invention is to provide an arrangement of parts which will "dry pick" a fowl more expeditiously and thoroughly than can be accomplished by hand, even when the carcass is scalded to loosen the hold of the feathers.

My invention also provides an attachment for removing such pin feathers as may remain and require special treatment for their removal.

My invention broadly comprehends both a method and a means for loosening the feathers in their matted or close and overlying position on the carcass and presenting them in a stream to the action of a plucking unit or element which acts to create rapid pulling actions or jerks occurring in quick succession during which jerks the feather stream is maintained continuously to carry away the feathers as fast as they are removed and to continuously present new feathers to the action of the plucker.

A major feature of my invention is the manner in which I employ an air suction of sufficient force to loosen the outer tips of the matted feathers and draw them into a casing into position to be engaged by the plucker in addition to which I arrange that the air currents shall be so directed that the incoming ends of feathers, comprising the mass of feathers, are pointed or directed accurately between the gripping surfaces of the plucker. The latter according to my invention is also constructed in such a way that the incoming air currents act upon the feathers after they have been gripped and removed, or partly removed and are being gripped again, to cause them to be maintained in a substantially straight line until they have actually passed beyond the influence of the grippers. In this way I am able to prevent all types of feathers from becoming entangled with the grippers or otherwise interfere with their proper operation.

A further object of my invention is to provide a plucker unit or element per se comprising two oppositely revolving elements so formed that they will grasp a feather or feathers, or a mass of feathers, move it a short distance, release it and grasp it again and continue the withdrawing action, at such a rapid rate of action that the elasticity in the skin of the fowl, once a feather has been grasped is unable to retract it before it is acted upon a second time, or even several times.

To these and other ends my invention consists in further improvements all of which will be further described in the following specification, the novel features thereof being particularly pointed out in the appended claims.

In the drawings:

Fig. 1 is a side elevation of an apparatus illustrating one embodiment of my invention;

Fig. 2 is a front elevation thereof;

Fig. 3 is an enlarged horizontal sectional view taken on the line $3x$—$3x$ of Fig. 1;

Fig. 4 is a detail view showing the plucker element in front elevation with the removable guard or comb in operative position;

Fig. 5 is a detail sectional view taken on the line $5x$—$5x$ of Fig. 4;

Fig. 6 is a horizontal sectional view taken on the line $6x$—$6x$ of Fig. 3, showing the plucker elements in gripping position.

Fig. 7 is a vertical sectional view taken on the line $7x$—$7x$ of Fig. 3;

Figs. 8, 9 and 10 are vertical sectional views similar to Fig. 5 showing the plucker elements in various operating positions illustrating the operation of the air currents;

Fig. 11 is a detail view of the pin picker;

Fig. 12 is a top plan view partly in section taken on the line $12x$—$12x$ of Fig. 11;

Fig. 13 is a cross sectional view taken on the line $13x$—$13x$ of Fig. 12;

Figs. 14 and 15 are enlarged sectional views showing the tips of the pin picker in different operative positions; and Fig. 16 is a plan view partly in section showing multiple form of pin picker.

Similar reference numerals of the several figures indicate similar parts.

The apparatus constructed in accordance with my invention is shown in Fig. 1 comprising a base 1 which may be mounted upon a suitable support and in practice I prefer to mount it upon a pedestal the upper end of which is indicated by 2. At the forward end of the base is fixed a blower casing or housing 3 containing fan blades 4, the size of these parts being sufficient to effect a strong inrush of air in the direction indicated by the arrows in Fig. 3. At the rear end of the base is mounted an electric motor 5 which is controlled by a circuit switch 6. The armature shaft of the motor is connected by a coupling 7 to a drive shaft 8 journalled in bearings on the rear side of the blower casing 3 and connected by gears 9 to the shaft 10 carrying the fan blades 4. The discharge conduit of the casing 11, preferably extends downwardly at one side of the base 1 and attached to it is a removable receptacle 12 such as a porous bag in which the feathers are caught and retained.

The front wall 16 of the casing 3, in its central area, is given a pyramidal form to provide a tapering air channel 17, the forward end of which is rectangular as indicated at 18. The forward end of the wall 16 forms a support or mounting for the feather plucking unit which forms an extension of the air passage 18 and carries at its forward end the plucking elements and the cooperating air passages. This unit may be constructed in any desired manner and in practice I have found it convenient to provide inner side walls 19 and 20 attached at their inner ends to an apertured plate 21 which is removably secured to the front face of the wall 16 by bolts or screws 17' (Fig. 1). The plate 21 at one side is provided with a lateral extension 22 which forms a support for the bearing for the drive shafts of the plucker element.

The feather removing device consists of upper and lower rotating members 25 and 26 each of which is provided at its two ends with journals. Those of the lower member are carried in bearings in the side walls or arms 19 and 20 and those of the upper roller 25 extend through apertures in said walls and are carried in journals on the forward extremities of arms 27 and 28 which are pivoted, as indicated at 29, to permit the member 25 to move relatively to the member 26. At their rear ends the arms 27 and 28 are provided with outwardly extending bosses which are normally pressed upwardly by springs 30 into engagement with adjustable stops 31, the arrangement of these parts being such that the member 25 is held in yielding engagement with the member 26 at all times. At one end the members 25 and 26 are provided with pinions 25a, 26a which engage respectively with intermeshing gears 35 and 36, the latter being mounted on a stub shaft 37 and the former being attached to a shaft 39 and journalled in bearing 40 on the web plate 41 which is supported by the arm 22. A similar bearing 42 on this plate extends at right angles to the first mentioned bearing and carries a shaft 43. A driving connection between shafts 39 and 43 is accomplished by a pair of beveled gears 44. A counter shaft 45 is united to the shaft 43 by a coupling 46 and supported in a bearing 47, parallel to the main shaft bearing, and is driven from the pinion 9 on the main shaft through a train of gears 48 which are designed to impart the desired speed of rotation to the members 25 and 26.

In connection with the actual removal of the feathers from a chicken, duck or other bird my invention comprehends the simulation of a hand picking operation in which the feathers are removed by a quick jerk, or a succession of jerks, as distinguished from a steady pull on a feather or bunch of feathers. To the end that this operation may be accomplished effectively, I also provide means for creating a feather stream, maintaining it centrally of the plucking devices during their operation and until the feathers which are removed are conveyed beyond the grippers. In carrying out these features I construct the plucking members 25 and 26 with a plurality of arcuate or segmental faces, two in the present instance being shown, and undercut the intervening areas as by flattening them. These members are geared together to rotate in opposite directions and their segmental faces as they come into successive engagement form grippers. The members revolve at a high rate of speed and impart a series of quick inward movements to the feathers. I have found in practice that a sharp movement followed by a release action and immediately succeeded by another pull of short duration will remove a feather, or group of feathers, very effectively and eliminates any tendency to tear the skin of the fowl even when this is very tender.

To accomplish the plucking successfully, I deem it essential that the feathers be presented to the plucking elements in a continuous narrow or flat stream in which their tips are caused to be laid down and are blown or sucked between the gripping surfaces. Further, in this particular, I have found it desirable, especially as feathers vary in size and length and also vary in the tenacity with which they are held in their sockets and therefore many of them require several pulls before they are dislodged, that it is equally desirable to continue to hold them centrally in what I have characterized as the feather stream until after they are clear of the plucking elements. Incidentally, I may mention that as a concomitant that this also serves to prevent entanglement of the feathers with the gripper elements which would otherwise interfere with their successful operation.

In the accomplishment of these objects, I make the plucking unit in the form of a casing by providing between the side walls 19, 20 a bottom 49 and a top 50. The latter is preferably removable by fitting its edges in grooves in the inner faces of the walls 19 and 20, as shown in Fig. 6, permitting it to be withdrawn endwise. On these parts I mount followers which rest upon the irregular surfaces of the members 25 and 26 to prevent the inrushing air from passing around said members. These followers may be spring plates 56, 57, extending the full width of the channel between the walls 19 and 20, and secured at their rear ends. At their forward ends the spring plates are bent inwardly, as shown, to provide short flanges which ride on the outer sides of the members 25, 26. One of the walls 49 or 50, preferably the upper one, is provided at its forward end with a guard lip the lower end of which engages the end of the bottom wall 49. This lip has two rounded portions which follow the contour of the members 25 and 26 and are spaced a short distance therefrom. At the center of the lip, or meeting point of said contours, is a slot, or series of alined slots, forming a combined air inlet and feather conduit 57', which is in alinement with the cooperating gripper surfaces. It is not required that this slot be very wide and in practice I make it only wide enough so that the quills of the largest feathers of a chicken or turkey can be squeezed through it as this insures that the skin of the bird will be held back by the guard lip and prevented from injury.

At each side of the passage 57', I provide air ports, such as the rows of perforations 58 and 59, which permit continuous streams of air to enter in a direction laterally of the main stream for smoothing out and matting down the edges and ruffled portions of the incoming feathers so as to present them in a somewhat regular manner to the grippers. Other rows of lateral air ports 60 and 61 may also be provided at points beyond those just described which at times perform the same function and cooperate with the previously mentioned ports for another purpose which I will now elaborate.

The undercut areas of the plucking members 25 and 26 are connected, either by slotting the members or perforating them with circular apertures, as indicated at 62, to provide airways through which more or less of the air entering the apertures 57', 58, 59, 60 and 61 will pass continuously, as will be observed from Figs. 8, 9 and 10. Before the commencement of the gripping operation a strong current of air entering the central opening 57' sucks or draws the points or fine ends of the feathers inwardly and the latter being further centrally directed by the air currents entering the adjacent lateral ports 58 and 59 are held clustered or prevented from spreading during their initial inward movement, and as they advance the feather stream is maintained by the lateral air currents which entering through the airways in said members in opposite directions impinge upon both sides of the feather stream as will be seen from Fig. 10. When the gripping action commences and while it continues, during the partial revolution in which the segmental surfaces are in engagement, the air currents instead of being cut off continue to be drawn through the central passage 57' and the lateral ports 58, 59 and 60, 61 but are deflected into the airways 62 in the two members, as shown in Figs. 8 and 9 to maintain the stream of feathers centrally or in substantially a straight line. The advantage in this last mentioned action lies in the fact that the ends of feathers which are not at this moment fully loosened are prevented from curling and adhering to the revolving members and other feathers which have been wholly detached are held out of contact with said members and freed from the others and being thus immediately liberated pass onward until they are finally deposited in the receptacle 12.

It will be readily observed that from the instant a feather, or group of feathers, is subjected to the air currents by reason of placing the carcass of a fowl in proximity to the front end of the casing of the plucker it is continuously under the action of such air currents so that once its movement has commenced there is no time when its progress is not being influenced or controlled by the air blast which is ever urging it onward.

Guards with various forms and arrangements of openings may be used as will be readily understood and I wish particularly to call attention to the fact that the precise arrangement described is not essential. The air currents controlling the feather stream are sufficiently strong to act in the manner described even when the guard itself is omitted. The said currents are directed by the constantly changing position of the revolving plucking members to draw the feathers inwardly, direct them into a continuous stream and prevent them from becoming entangled with the revolving members quite as satisfactorily as when a guard is employed. This is due to the fact that when the grippers are disengaged, as shown in Figs. 5 and 10, a considerable portion of the inrushing air passes between them and a smaller part enters the openings 62 from opposite directions forming lateral currents serving to flatten the incoming feather stream. When the grippers are closed all of the air enters the openings 62 which at first are in the position shown in Fig. 8 directing the air currents downwardly and inwardly at an angle to keep the ends of the feathers out of contact with the members 25 and 26; subsequently as the latter rotate into the position shown in Fig. 9 the air streams become horizontal, delivering the blast longitudinally of the channel.

In Figs. 4 and 5, I have illustrated an additional guard in the form of a comb 70 which may be used to advantage in plucking certain kinds of fowl. The teeth of the comb project upwardly from a plate 71 which is adjustable vertically by means of slots 72 and set screws 73 which secure the plate of the upturned end of a supporting plate or bracket 74 which in turn is adjustable relatively to the plucking unit by means of the slot 75 and the wing clamping nut 76. When it is not desired to use the comb the nut 76 may be loosened permitting the bracket and comb to be rotated to one side as indicated by dotted lines in Fig. 4.

In certain classes of work I have found it desirable to provide the outer or contour end of the guard with a hinge 50a so that it may be turned back to the position shown in dotted lines in Fig. 5 when the comb 70 is employed during the removal of the larger and heavier wing and tail feathers.

I find in practice that when the feathers are removed by the method which I have described that few, if any, pin feathers, or "pins" as they are sometimes called, remain. However, when pins do exist in the skin of a fowl it has heretofore been necessary to remove them by hand. By means of a slight modification of my plucking members, I am able to utilize the same principle and provide a simple attachment for accomplishing this purpose which is shown in Figs. 11 and 12. The attachment consists of a frame piece comprising a tubular holder 80 having a rear end 81 fitting a socket in a hub 82 on the frame piece 41 and removably locked thereto by a bayonet joint and pin 83. The parts just described are located in alinement with the bearing 42 and provided on the forward end of the shaft 43 is a stub end 43a which is recessed and slotted transversely as indicated at 43b (Fig. 3), The holder 80 carries a small shaft 83' having at its rear end a collar 84 which is provided with flat projections 85 which engage in the recess 43b for the purpose of interlocking the shafts 43b and 83'.

At an intermediate point of the shaft 83' a small pinion 86 is fixed thereto in a recess in the holder 80 opposite which there is pivoted a bearing block 87 having a similar recess and carrying a short shaft 88 provided with a pinion 89 by means of which it is rotated simultaneously with and in a direction opposite to that of the shaft 83'. The jointed attachment of the bearing block 87 to the holder 80 is accomplished by providing the former with trunnions 90 and the latter with bearing plates 91 which embrace the trunnions. Pinions 86 and 89 may, if desired, be slightly beveled.

The two shafts 83' and 88 converge at their forward ends where they are tapered, as indicated at 92, to form tips of small diameter as shown in Figs. 11 and 12. I cut the material from one side of each tip to provide an entrance space 93 into which the pins, or quills of undeveloped feathers, may enter as shown in Fig. 14, to be pulled out of the skin of the fowl by the continued rotation of the shafts as indicated in Fig. 15. Beneath the forward ends of the shafts, I provide a guard plate 94 provided at its forward end with a central slot 95, the bottom edge of which terminates slightly beyond the opening formed by the cutaway portions 93. On fowl the undeveloped feathers or pins project only slightly beyond the surface of the skin and on a freshly plucked fowl they are soft and lacking in rigidity. Usually these pins lie close to the skin and as they are usually quite short, I provide the shafts comprising the depinner with the tapered ends as described and place the end of the guard 94 with its slot 95 in proximity to them. The guard is preferably arched as shown in Figs. 14 and 15 and its outer end is slightly flexible. In operation the portion of the skin of the fowl containing pinfeathers which it is desirable to remove is brought in contact with the underside of the guard 94 and pressed against it and guided by the hands of the operator so as to cause the pins to enter the slot 95 contact with the sides of which, or with the ends of the rotating shafts 83' and 88, will cause the pins to assume a more or less upright position so that their extremities will pass into the slot 93. Because of the variance in size of the undeveloped feathers, quills or pins and also because some of these are very soft and therefore extremely weak, and easily cut, I provide for the relative movement of one of these shafts with reference to the other. The forward ends of the shafts are held in yielding contact by means of a U-shaped spring 96, carried on the hinged bearing block 87, having an end which bears against the side of the holder 80 as illustrated in Fig. 12.

In Fig. 16, I have shown another arrangement of the pin picker comprising a plurality of sets of the pin extracting members which it is advantageous to use in some instances. It comprises a holder 100 in which a main driver member or shaft 101, corresponding to the shaft 83', is centrally located. The companion shaft cooperating directly therewith and corresponding to shaft 88, is indicated by 101a. Other pairs of shafts 102, 102a and 103, 103a are located at opposite sides of the pair first mentioned. The shafts are all disposed radially as shown and simultaneous movement is imparted to them by train gears or pinions 104. The latter are located in a slot 105 in the holder which is of sufficient width to permit the shafts to move rearwardly a short distance to relieve the contact pressure between their forward pointed ends when occasion requires and to this end I provide springs 106, held in position beneath cap screws 107, which exert sufficient pressure to hold the cooperating ends of the respective pairs of shafts in operative engagement. In this type of attachment I make the guard 108 with a plurality of notches 109 underlying the grippers formed by the forward ends of each pair of shafts. This type of depinner is serviceable where speed is essential as in handling a large number of birds daily. I have also found it advantageous as a means of removing from the carcass small feathers in depressed and irregular places which exist on and beneath the wings of a bird and in cases where "down", because of its fluffiness and short length and possible matted condition which is sometimes encountered, is difficult to remove by the main plucking elements.

What is claimed is:

1. A machine for plucking feathers from fowl comprising a casing, intermittently engaging members operating to grasp feathers and to impart short pulling impulses thereto in rapid succession, means for creating an inward current of air in the casing continuously to draw feathers into engagement with said members, and movable air passages moved in synchronism with the engaging members for directing part of said air stream either into currents from opposite sides of the point of engagement of said members when engaged or between them during their periods of disengagement.

2. In a fowl plucking machine comprising a casing having an end plate having a central opening for admitting a stream of feathers and air and additional air inlet ports at each side thereof for maintaining the feather stream in a central position, means for creating an inward flow of air through said opening and said ports, and plucking members in the casing operating to intermittently grasp feathers drawn into the central opening and impart a succession of rapid pulling movements thereto.

3. A fowl plucking machine comprising a casing, means for creating an inward flow of air therein, said casing having an end portion provided with a plurality of openings through which feathers are drawn and by which air currents are directed against opposite sides of the stream of feathers to direct them in alinement with the central opening, and a pair of plucking members arranged to intermittently engage feathers comprising the feather stream and impart a succession of rapid pulling movements thereto, said plucking members also being provided with air passages extending transversely therethrough.

4. A fowl plucker comprising two revoluble members rotating in opposite directions having portions engaging to form a gripper, said members being provided with transverse air passages extending therethrough, a casing forming an air passage enclosing said members having an air inlet and feather passage centrally disposed with respect to and in front of said members, and means for causing a steady current of air to flow into the casing.

5. A fowl plucker comprising two revoluble members rotating in opposite directions having portions engaging to form a gripper, said members being provided with transverse openings, a casing forming an air passage enclosing said members having an air inlet and feather passage centrally disposed with respect to and in front of said members, means for causing a flow of air into the casing, and means within the casing cooperating with the revoluble members serving to cause air currents to alternately flow between said members and through the openings thereof when their engaging portions are respectively in gripping position and are disengaged.

6. In a plucker element for a machine for removing feathers from fowl comprising two members each having a plurality of spaced segmental faces, the intervening areas being undercut, and mounted to rotate in unison to successively bring their respective segments into engagement, said members also having transverse apertures providing an air passage connecting the undercut areas.

7. In a fowl plucker, the combination with a plucker element comprising two reversely rotating members having spaced segmental faces which successively pass into cooperative engagement to form grippers and provided with intermediate undercut areas in open communication to form air passages through said members and further provided with transverse air ports through each of said members, of a casing enclosing said element having a combined air inlet and feather passageway in central alinement with the meeting point of said members and followers riding against the members to prevent the escape of air between their outer surfaces and the contiguous sides of the casing, and a suction producing device attached to the casing.

8. In a fowl plucker, the combination with a plucker element comprising two reversely rotating members each having two diametrically disposed segmental faces which successively engage to form grippers, the connecting side walls of the members being cut away and provided with transverse openings forming air passages, of a casing enclosing the element having a combined air inlet and feather passageway in alinement with the meeting points of said segmental faces, movable followers riding on the outer sides of the members and serving to maintain the spaces between them and the sides of the casing closed in all positions of the members, and means for maintaining a continuous flow of air through the casing inlet and between and through the rotating members.

9. The method of plucking fowl consisting in creating a feather stream, and rapidly engaging said feathers intermittently and imparting to them a short pulling movement during each such engagement and maintaining the feathers forming the stream in a straight line before and during the pulling movements.

10. The method of plucking fowl consisting in creating a feather stream by a continuous air current in a direction away from the surface of the fowl, rapidly engaging said feathers intermittently and imparting to them a short pulling movement during each such engagement and subjecting said stream to lateral air currents between pulling movements, so that the feathers are maintained in a straight line before, during and after the pulling movement.

11. A device for removing pin feathers from plucked fowl comprising two oppositely rotating shafts mounted at an angle to each other and having conical collaterally engaging ends of small diameter, the shafts being journaled at their large ends, the small ends being free.

12. A device for removing pin feathers from plucked fowl comprising two oppositely rotating shafts of small diameter mounted at an angle to each other and having conical collaterally engaging ends provided with cooperating flattened faces at their extremities, the small ends being free.

13. A device for removing pin feathers from plucked fowl comprising a holder, a bearing block hinged thereon, two shafts journalled respectively in the holder and block at an angle to each and tapered at their meeting ends and having rounded open-ended extremities, and a guard supported on the holder and having a slot in alinement with the meeting line of the points of said shafts.

14. A device of the character described comprising a holder, three or more shafts thereon arranged in angularly disposed pairs, said shafts being provided with free conical ends of small diameter, said ends being in collateral engagement, and means for revolving the several shafts simultaneously and those of each pair in opposite directions.

15. A device of the character described comprising a holder, a plurality of pairs of oppositely revolving radially disposed shafts, said shafts being provided with free conical ends of small diameter, those of each pair being in operative collateral engagement at their free ends, and means for guiding objects between such engaging surfaces.

16. A plucking machine comprising a pair of collaterally disposed plucking rolls, means for rotating the same in opposite directions, and means to draw air through said rolls, each of said rolls being provided with a plurality of air passages extending through the body of the roll transversely of its axis.

17. A plucking machine comprising a pair of collaterally disposed plucking rolls, means for rotating the same in opposite directions, and means to draw air through said rolls, each of said rolls being cut away to form segmental plucking portions with intermediate cut-away portions, and being further provided with a plurality of air passages extending through the body of the roll transversely of its axis.

18. A plucking machine comprising a pair of collaterally disposed plucking rolls, means for rotating the same in opposite directions, and means to draw air through said rolls, each of said rolls being cut away on opposite sides to form segmental plucking portions with intermediate cut-away portions, and being further provided with a plurality of air passages extending transversely therethrough between the opposed cut-away portions.

19. A plucking unit comprising a stationary plucking roll provided with a pinion at one end thereof, a plucking roll movable toward and from the stationary plucking roll and also provided with a pinion at one end thereof, resilient means urging the movable plucking roll into engagement with the stationary plucking roll, a gear meshing with the pinion of the movable plucking roll, said plucking roll being movable about said gear as a center, and a similar gear meshing with the pinion of the stationary roll, the said pinions clearing one another and the said gears engaging one another, and external driving means for driving one of the gears, whereby the plucking rolls are rotated synchronously in opposite directions regardless of movement of the movable plucking roll.

20. A plucking unit comprising a stationary plucking roll provided with a pinion at one end thereof, a plucking roll movable toward and from the stationary plucking roll and also provided with a pinion at one end thereof, said movable plucking roll being mounted on a pair of levers provided with resilient means urging the movable plucking roll into engagement with the stationary plucking roll, a gear meshing with the pinion of the movable plucking roll, said gear being centered at the fulcrum of the levers, and a similar gear meshing with the pinion of the stationary roll, the said gears meshing with one another, and external driving means for driving one of the gears, whereby the plucking rolls are rotated synchronously in opposite directions regardless of movement of the movable plucking roll.

21. A feather plucking machine comprising a base, a blower having a short generally cylindrical blower housing mounted at the forward end of the base with its axis extending longitudinally of the base, a driving motor at the rear of said base with its axis extending in the same direction and operatively connected to the blower, a short plucking head rigidly mounted directly upon the forward face of the blower housing, a drive shaft at one side of the blower housing, a train reduction gearing in back of said blower housing connecting the motor shaft to said drive shaft, rotary plucking members disposed at the front end of the plucker head in direct alignment with the air inlet path of the blower, and means connecting the plucking members to the drive shaft.

EDWARD H. HINCHLIFFE.